Patented Apr. 19, 1932

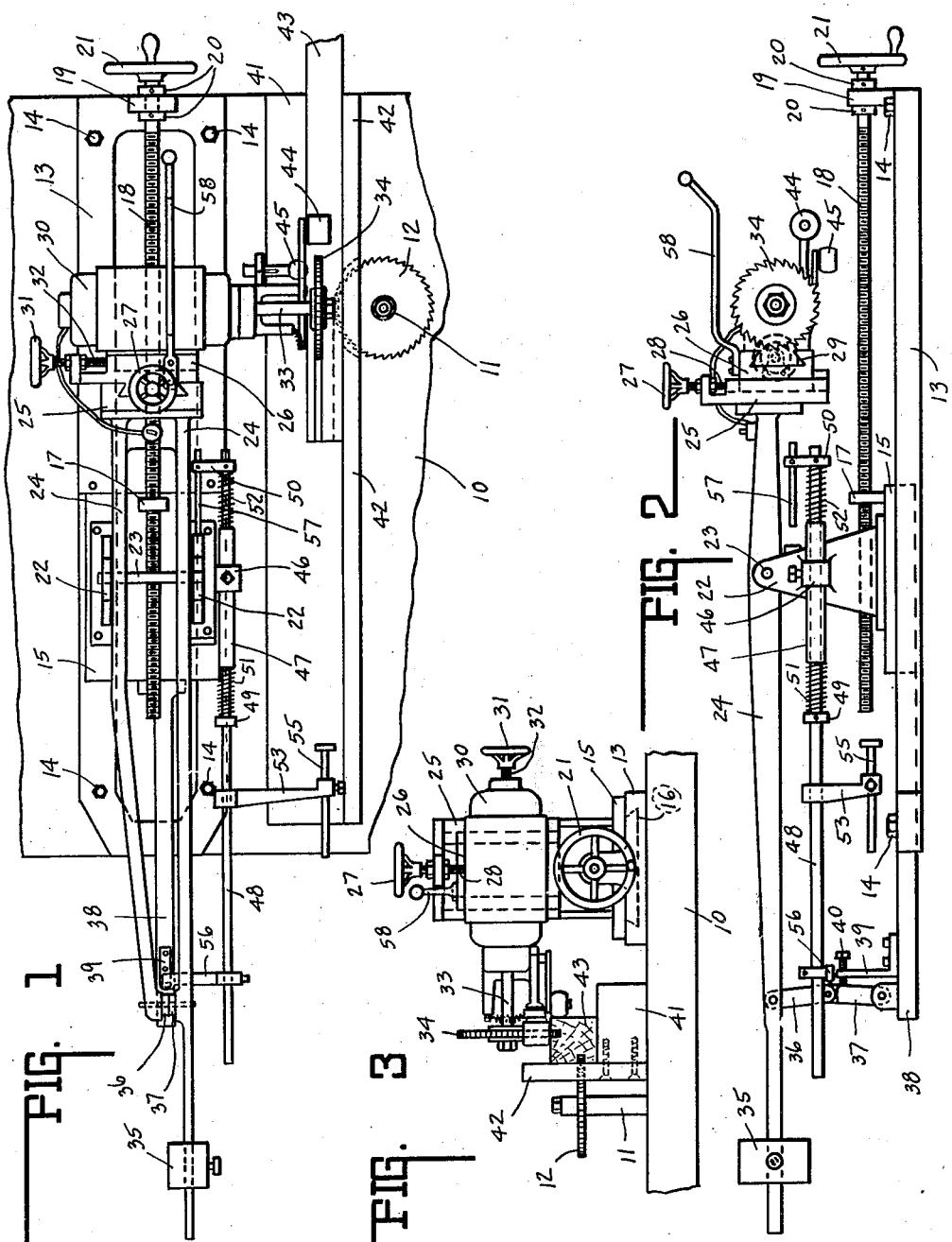

1,854,445

UNITED STATES PATENT OFFICE

ARTHUR J. CALPHA, OF BRAZIL, INDIANA, ASSIGNOR TO INDIANA FOUNDRY, MACHINE & SUPPLY COMPANY, OF BRAZIL, INDIANA, A CORPORATION

MACHINE TOOL

Application filed May 18, 1931. Serial No. 538,049

This invention relates particularly to an attachment to be used with a vertical spindle shaper by means of which two tools may be made to work on the same piece of work simultaneously although certain features of the invention are applicable to other forms of machine tools.

The principal object of the invention is to provide an attachment which may be readily placed upon the common form of vertical spindle shaper by means of which the use of the shaper may be substantially doubled.

Another feature of the invention resides in the provision of means for automatically removing one tool from engagement with the work at a predetermined point in the advancement of the work toward the tools while the second tool is permitted to operate upon the work through a longer portion of said advancement.

Other features of the invention reside in the particular arrangement of parts as particularly pointed out in the following description and claims and the accompanying drawings:

Figure 1 is a plan view of the attachment fastened upon a work table of a vertical spindle shaper. Figure 2 is a side elevation of the attachment, and Figure 3 is an end view thereof including portions of the shaper.

In the drawings, there is illustrated a portion of a shaper having a substantially flat work table 10 through which a vertical spindle 11 projects. The said spindle is rotatable by any well known means and carries a rotary cutting tool 12 in the usual manner. A removable frame 13 is herein shown bolted to the said work table by means of bolts 14 although the same may be secured thereto in any suitable manner. The said frame carries a slide 15 adapted to move horizontally in suitable dovetail guideways 16. The slide 15 carries a bracket 17 threadedly engaged with a screw rod 18. An unthreaded portion of the said screw rod passes through a bracket 19 formed upon the frame 13. Confining collars 20 are provided to prevent longitudinal movement between said screw rod and bracket 19. A hand wheel 21 is carried upon the said screw rod for rotating the same. By means of this construction, the slide 15 may be moved upon the guideways 16 as desired.

The slide 15 carries a pair of upwardly-extending brackets 22 in turn supporting a horizontal shaft 23. A pair of levers 24 are pivotally mounted upon said shaft at a point between their ends. A dovetailed member 25 is carried upon one end of said levers and in turn carries a base 26 which is vertically adjustable thereon by means of a hand wheel 27 and screw 28. The base 26 is also furnished with a dovetail guideway 29 and a motor 30 is slidably mounted therein. The said motor may be horizontally moved upon said guideway by means of a hand wheel 31 and a screw 32. The motor 30 carries an extended spindle 33 upon which there is carried a rotary cutting tool 34.

The opposite end of one of the levers 24 carries an adjustable counterweight 35 and the said levers are pivotally fastened to the upper end of a toggle link 36 in turn fastened to a second toggle link 37. The lower end of the toggle link 37 is pivotally fastened to a bar 38, the opposite end of which is fastened to the slide 15 and is movable therewith. The bar 38 also carries a bracket member 39 upon the upper end of which there is mounted an adjusting screw 40. In the normal operating position of the device, the toggle links assume the positions shown in Figure 2 in which the link 37 abuts against the adjusting screw 40 and the said links support the levers 24. When pressure is applied to the said toggle links to move the same away from the adjusting screw, the supporting effect upon the levers 24 is lost and the counterweight 35 then moves the levers to elevate the motor and the tool carried thereby.

A pair of guide members 41 and 42 are mounted upon the work table 10 in the proper position to guide a piece of work 43 into engagement with the two work tools 12 and 34. A pair of adjustable rollers 44 and 45 are carried upon an extension of the housing of motor 30 and serve to maintain the work in contact with the guide members 41 and 42.

One of the brackets 22 carries a bearing 46 in which there is fixedly mounted a tubular member 47. A trip rod 48 is slidably mounted in said tubular member and carries collars 49 and 50 on either side thereof. A pair of compression springs 51 and 52 abut against the collars 49 and 50 respectively and against the opposite ends of the tubular member 47. The said springs, therefore, serve to normally maintain the trip rod 48 in a predetermined position. The trip rod 48 carries an arm 53 in turn carrying an adjustable contact piece 55 which projects into the path of travel of the work 43. The said trip rod also carries an arm 56 adapted to engage the toggle links 36 and 37 at or near their junction point. The collar 50 carries an adjustable stop member 57 which is positioned to engage one of the brackets 22 to limit the travel of the trip rod 48.

In the operation of the device, the work 43 is advanced toward the tools 12 and 34 and each of said tools cuts a groove therein, as best shown in Figure 3. When the work engages the contact piece 55, the trip rod 48 is moved to bring the arm 56 into engagement with the toggle links 36 and 37. The said toggle links are thereby moved into non-supporting position and the tool 34 is raised out of contact with the work. Further movement of the work brings the stop member 57 into engagement with the bracket 22 so that the work can be moved no further. When the work has been withdrawn, the levers 24 are returned to operating position by pulling downwardly on a handle 58 attached to the base 26. The toggle links 36 and 37 then spring into supporting position and the device is ready to operate on a new piece of work.

By means of the apparatus described, it is possible for a common type of shaper to be equipped to perform two operations upon the work at the same time although the length of travel of the work for the two operations may be different. More specifically, the length of the cut made by tool 34 depends entirely upon the adjustment of the contact piece 55 while the length of cut of tool 12 may be independently controlled by adjustment of stop member 57. This is especially useful in the forming of certain members in the manufacture of furniture although the use of the invention is not to be limited to that field.

The invention claimed is:

1. In combination with a shaper having a substantially flat work table and a vertical spindle projecting above said work table and carrying a rotary working tool, a removable frame bolted to said work table, a bracket carried thereby, a lever pivotally mounted upon said bracket at a point between its ends, a second rotary cutting tool and means for rotating the same carried upon one end of said lever, a counterweight carried upon the opposite end of said lever, means for normally maintaining said lever in position for said second tool to engage a piece of work advanced to engage said first cutting tool, and mechanism engageable by said work at a predetermined point in its advancement for tripping said maintaining means to permit said counterweight to move said lever to bring said second tool out of work-engaging position.

2. In combination with a shaper having a substantially flat work table and a vertical spindle projecting above said work table and carrying a rotary working tool, a removable frame bolted to said work table, a bracket slidably carried thereby, means for adjustably positioning said bracket, a lever pivotally mounted upon said bracket at a point between its ends, a second rotary cutting tool and means for rotating the same carried upon one end of said lever, a counterweight carried upon the opposite end of said lever, means for normally maintaining said lever in position for said second tool to engage a piece of work advanced to engage said first cutting tool, and mechanism engageable by said work at a predetermined point in its advancement for tripping said maintaining means to permit said counterweight to move said lever to bring said second tool out of work-engaging position.

3. In combination with a shaper having a substantially flat work table and a vertical spindle projecting above said work table and carrying a rotary working tool, a removable frame bolted to said work table, a bracket carried thereby, a lever pivotally mounted upon said bracket at a point between its ends, a second rotary cutting tool and means for rotating the same carried upon one end of said lever, a counterweight carried upon the opposite end of said lever, a toggle linkage for normally maintaining said lever in position for said second tool to engage a piece of work advanced to engage said first cutting tool, and mechanism engageable by said work at a predetermined point in its advancement for tripping said toggle linkage to permit said counterweight to move said lever to bring said second tool out of work-engaging position.

4. In combination with a shaper having a substantially flat work table and a vertical spindle projecting above said work table and carrying a rotary working tool, a removable frame bolted to said work table, a bracket carried thereby, a lever pivotally mounted upon said bracket at a point between its ends, a dovetailed member carried by one end of said lever, a sliding base adjustably carried upon said dovetailed member, a motor and a second rotary cutting tool mounted on said base and adjustable thereon at right angles to the adjustment of said base upon said dovetailed member, a counterweight carried upon the opposite end of said lever, means for normally maintaining said lever in position for said second tool to engage a piece of work advanced to engage said first cutting tool, and mechanism engageable by said work at a predetermined point in its advancement for tripping said maintaining means to permit said counterweight to move said lever to bring said second tool out of work-engaging position.

5. In a machine tool, the combination of a lever pivotally mounted at a point between its ends, a rotatable cutting tool and means for rotating the same carried upon one end of said lever, a counterweight upon the other end of said lever, means for normally maintaining said lever in position for said tool to engage a piece of work advanced toward the same, and mechanism engageable by said work at a predetermined point in its advancement for tripping said maintaining means to permit said counterweight to move said lever to bring said tool out of work-engaging position.

6. In a machine tool, the combination of a lever pivotally mounted at a point between its ends, a rotatable cutting tool and means for rotating the same carried upon one end of said lever, a counterweight upon the other end of said lever, a toggle linkage normally maintaining said lever in position for said tool to engage a piece of work advanced against the same, and a trip device engageable by said work at a predetermined point in its advancement and adapted to trip said toggle linkage to permit movement of said lever for moving said tool from work-engaging position.

7. In a machine tool, the combination of a lever pivotally mounted at a point between its ends, a dovetailed member carried by one end of said lever, a sliding base adjustably carried upon said dovetailed member, a motor and a rotary cutting tool mounted on said base and adjustable thereon at right angles to the adjustment of said base upon said dovetailed member, a counterweight upon the other end of said lever, means for normally maintaining said lever in position for said tool to engage a piece of work advanced toward the same, and mechanism engageable by said work at a predetermined point in its advancement for tripping said maintaining means to permit said counterweight to move said lever to bring said tool out of work-engaging position.

In witness whereof, I have hereunto affixed my signature.

ARTHUR J. CALPHA.